United States Patent
Friedberg et al.

(10) Patent No.: US 10,161,952 B2
(45) Date of Patent: Dec. 25, 2018

(54) DIODE NOISE FILTER FOR A SPEED SENSOR WITH MECHANICALLY-INDUCED ELECTRICAL NOISE

(71) Applicant: HAMILTON SUNDSTRAND CORPORATION, Charlotte, NC (US)

(72) Inventors: Craig Friedberg, Stillman Valley, IL (US); Dean A. Norem, Cherry Valley, IL (US); Dennis A. Erickson, Rockton, IL (US); James C. France, Janesville, WI (US); Christopher J. Courtney, Janesville, WI (US); Timothy Maver, Glastonbury, CT (US); Aaron T. Gibson, Roscoe, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 262 days.

(21) Appl. No.: 15/150,730

(22) Filed: May 10, 2016

(65) Prior Publication Data

US 2017/0328929 A1  Nov. 16, 2017

(51) Int. Cl.
*G01P 3/44* (2006.01)
*B64C 27/04* (2006.01)
*G01P 3/488* (2006.01)

(52) U.S. Cl.
CPC ............. *G01P 3/44* (2013.01); *B64C 27/04* (2013.01); *G01P 3/488* (2013.01)

(58) Field of Classification Search
CPC ........................................................ G01P 3/44
See application file for complete search history.

(56) References Cited

U.S. PATENT DOCUMENTS

| 4,345,237 A * | 8/1982 | Lerche | B64C 27/007 |
| | | | 244/17.11 |
| 5,304,963 A * | 4/1994 | Shinjo | G01B 7/30 |
| | | | 333/172 |
| 5,736,852 A | 4/1998 | Pattantyus | |
| 9,063,176 B2 | 6/2015 | Barnett | |
| 2014/0268442 A1 | 9/2014 | Seidl | |

OTHER PUBLICATIONS

European Search Report for EP Application No. 17170457.0 dated Oct. 19, 2017; 8 pages.

* cited by examiner

*Primary Examiner* — Phuong Huynh
(74) *Attorney, Agent, or Firm* — Cantor Colburn LLP

(57) ABSTRACT

A system for filtering mechanically-induced signal noise from a speed sensor may include a rotating member having at least one target group radially oriented about a center of the rotating member, an inductive speed sensor configured to sense the at least one target group, and two diode pairs each having a first diode and a second diode. The two diode pairs may be operatively connected to the inductive speed sensor and configured to receive a signal having the mechanically-induced signal noise. The system may also include a resistor connecting the diode pairs, a processor connected in parallel with the resistor and configured to receive a signal from the inductive speed sensor. The processor may be configured to receive a signal having reduced signal noise via the diode pairs, and determine a rotational speed of the rotating member based on the signal having reduced signal noise.

12 Claims, 5 Drawing Sheets

View A-A

DIODE NOISE FILTER FOR A SPEED SENSOR WITH MECHANICALLY-INDUCED ELECTRICAL NOISE

BACKGROUND

The present disclosure relates to diode noise filters, and more specifically, to a diode noise filter for a speed sensor with mechanically-induced electrical noise.

A magnetic pick up speed sensor may be used to measure the speed of a rotating shaft in speed sensing electronics by measuring a change of magnetic flux inside of a sensor as magnetic targets on the rotating shaft pass the sensor position. In helicopters, speed sensors may detect rotational speed and direction of the propeller. The propeller may receive rotational power via a high power gear train. The high power gear train driving the propeller can result in a high frequency vibration of the rotating shaft. The high frequency vibration can result in an erroneous electrical signal at the frequency of the gear train during target nulls that are required to measure rotational direction.

SUMMARY

According to an embodiment, a system for filtering mechanically-induced signal noise from a speed sensor is described. The system may include a rotating member having three target groups radially oriented about a center of the rotating member, an inductive speed sensor configured to sense a target group of the three target groups, and two diode pairs each having a first diode and a second diode. The two diode pairs are operatively connected to the inductive speed sensor and configured to receive a signal having the mechanically-induced signal noise. The system also includes a resistor connecting the diode pairs, and a processor connected in parallel with the resistor and configured to receive a signal from the inductive speed sensor. The processor may be configured to receive a signal having reduced signal noise via the diode pairs, and determine a rotational speed of the rotating member based on the signal having reduced signal noise.

According to another embodiment of the present invention, a computer-implemented method for filtering mechanically-induced signal noise from an inductive speed sensor is described. The method may include sensing at least one target group attached to a rotating member with the inductive speed sensor, reducing noise in a signal sensed with the inductive speed sensor with two diode pairs connected to the inductive speed sensor and to a resistor. Each diode pair has a first diode and a second diode. The method may further include receiving the signal having the reduced noise with a processor, and determining a rotational speed of the rotating member based on the signal received.

According to another embodiment, a helicopter configured with a system for filtering mechanically-induced signal noise from a speed sensor is described. The system may include a rotating shaft having at least one target group radially oriented about a center of the rotating member, an inductive speed sensor configured to sense the at least one target group, and two diode pairs each having a first diode and a second diode. The two diode pairs may be operatively connected to the inductive speed sensor and configured to receive a signal having the mechanically-induced signal noise. The system may also include a resistor connecting the diode pairs, and a processor connected in parallel with the resistor and configured to receive a signal from the inductive speed sensor. The processor may be configured to receive a signal having reduced signal noise via the diode pairs, and determine a rotational speed of the rotating shaft based on the signal having reduced signal noise.

BRIEF DESCRIPTION OF THE DRAWINGS

The subject matter regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
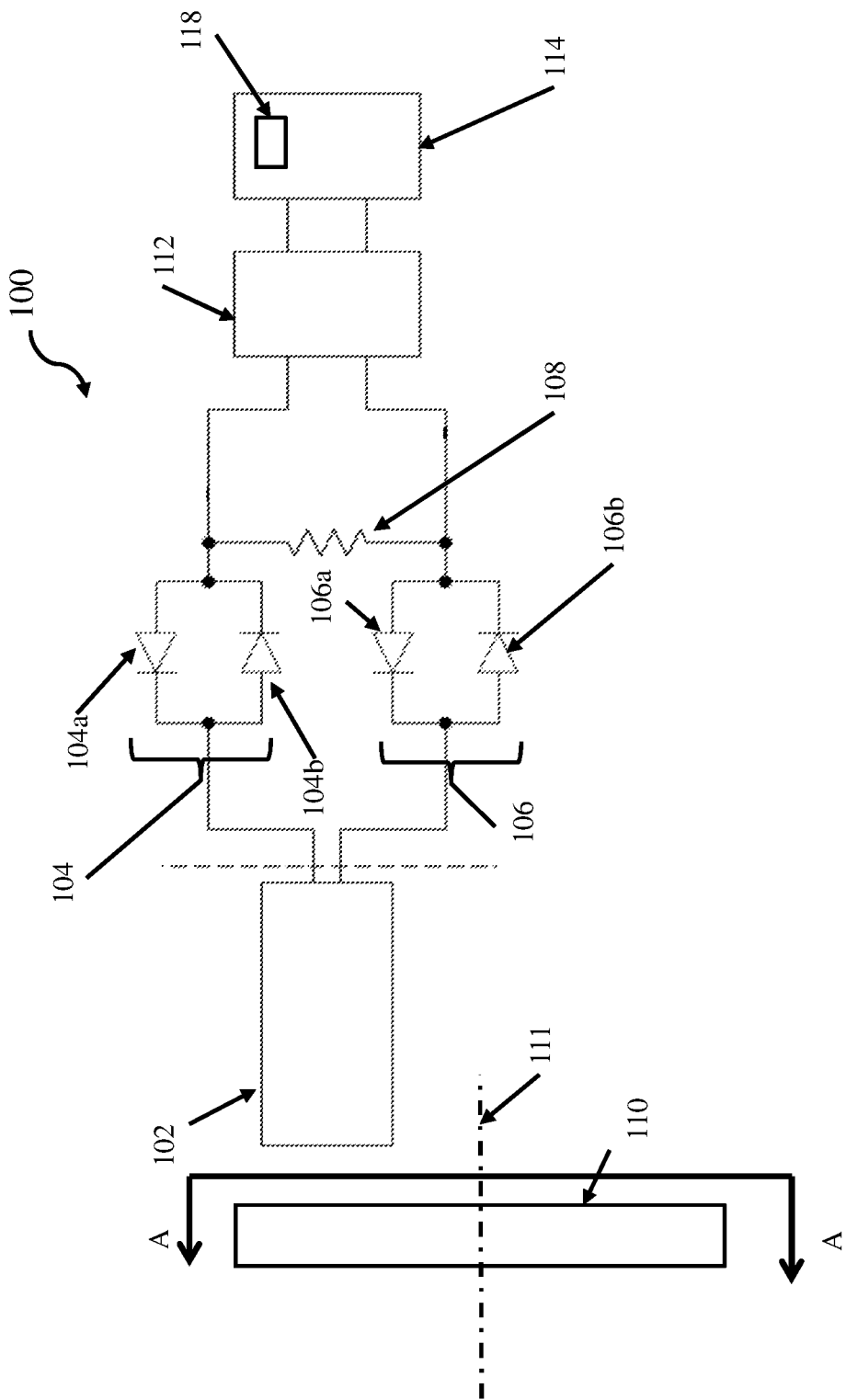
FIG. 1 depicts a system for filtering mechanically-induced signal noise from a speed sensor according to one embodiment.

FIG. 1 depicts a system 100 for filtering mechanically-induced signal noise from a speed sensor 102, according to one embodiment. Referring now to FIG. 1, in some aspects system 100 may include a rotating member 110, an inductive speed sensor 102, two diode pairs 104 and 106, a resistor 108, and a signal converting unit 114. In some embodiments, system 100 may further include a breakout box 112.

Figure 2:
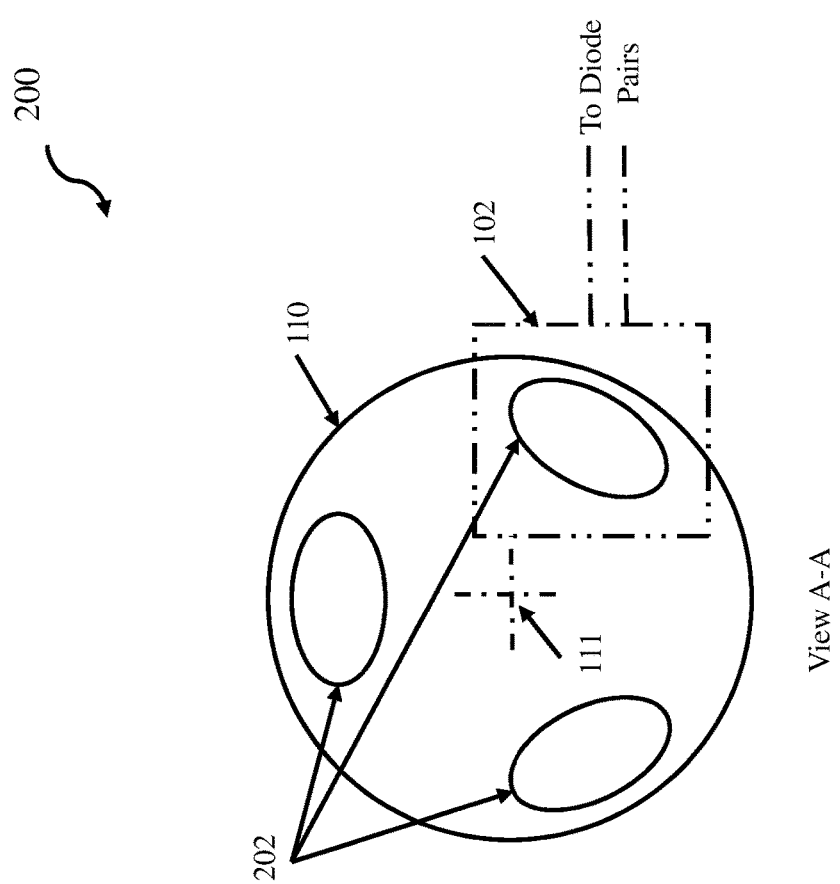
FIG. 2 depicts a view of a rotating member configured with a plurality of target groups according to one embodiment.

Rotating member may be a shaft or a wheel configured to drive a load (not shown). View A-A, as shown in FIG. 2, depicts an end view of rotating member 110. Referring briefly to FIG. 2, a view of rotating member 110 is depicted according to some embodiments. Rotating member 110 may include at least one target group 202. According to some embodiments, rotating member 110 may include three (as depicted in FIG. 2) or more target groups. A target group may include one or more elements that create magnetic flux changes, which may interact with inductive speed sensor 102 to produce detectable changes in voltage as target groups 202 rotate about an axis 111 of rotating member 110. Although target groups 202 are shown in FIG. 2 on a face of rotating member 110, target groups 202 may be configured on the side of rotating member 110, and inductive speed sensor 102 may be configured to sense a rotational speed of rotating member 110 while configured on an outer edge of the periphery of the member. In some embodiments, rotating member 110 may be a propeller of a helicopter, or another axially rotating shaft in communication with a power train.

Referring again to FIG. 1, inductive speed sensor 102 may be operatively connected to diode pairs 104 and 106. Accordingly, inductive speed sensor 102 may be configured to sense a target group of the three or more target groups 102 as it rotates about the shaft axis 111, and detect a change in magnetic flux. Inductive speed sensor 102 may transmit a signal having mechanically-induced signal noise to diode pairs 104 and 106.

Diode pairs 104 and 106 may each include a first diode and a second diode, where the two diode pairs are operatively connected to inductive speed sensor 102 and configured to receive the signal having the mechanically-induced signal noise. For example, diode 104*a* and 104*b* must be configured for an opposite current flow with respect to teach other, and diode 106*a* and 106*b* must be configured for an opposite current flow with respect to each other. According to some embodiments, system 100 may include no more than two diode pairs 104 and 106.

Resistor 108 may be configured to connect diode pair 104 and diode pair 106.

Signal converting unit 114 may include a processor 118 that may be configured to receive a signal from inductive speed sensor 102 in parallel with resistor 108. Processor 118 may receive a signal having reduced signal noise via diode pairs 104 and 106, and determine a rotational speed of rotating member 110 based on the signal having reduced signal noise.

Figure 3:
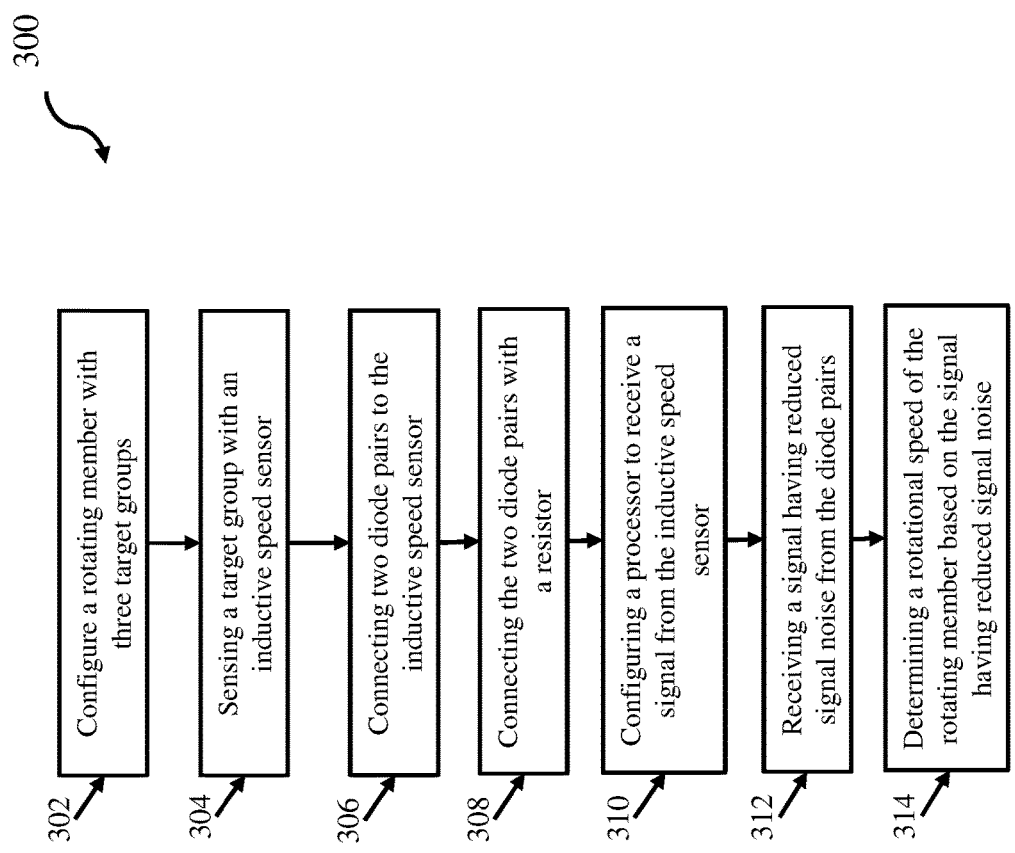
FIG. 3 depicts a flow diagram of a method for filtering mechanically-induced signal noise from a speed sensor according to one embodiment.

FIG. 3 depicts a flow diagram of a computer-implemented method 300 for filtering mechanically-induced signal noise from speed sensor 102, according to one embodiment. As shown in block 302, in some aspects method 300 may include configuring a rotating member with three or more target groups radially oriented about a center of the rotating member.

As shown in block 304, method 300 may include sensing a target group of three target groups 202 with inductive speed sensor 102.

Method 300 may further include connecting diode pairs 104 and diode pair 106 to inductive speed sensor 102, as shown in block 306. In some aspects each diode pair may include a first diode and a second diode. For example, a first diode 104*a* in diode pair 104 must be configured for an opposite current flow with respect to a second diode 104*b* in diode pair 104. A first diode 106*a* in diode pair 106 must be configured for an opposite current flow with respect to a second diode 106*b* in diode pair 104. Diode pairs 104 and 106 may be configured to receive a signal from inductive speed sensor 102 having the mechanically-induced signal noise caused by drive train loads driving rotating member 110.

Method 300 may further include connecting the diode pairs 104 and 106 with resistor 108, as shown in block 308.

As shown in block 310, method 300 may include configuring processor 118 to receive a signal from inductive speed sensor 102 in parallel with resistor 108.

In some aspects, processor 118 may be configured for receiving a signal having reduced signal noise via diode pairs 104 and 106, as shown in block 312.

As shown in block 314, processor 118 may be further configured for determining a rotational speed of the rotating member based on the signal having reduced signal noise.

Figure 4:
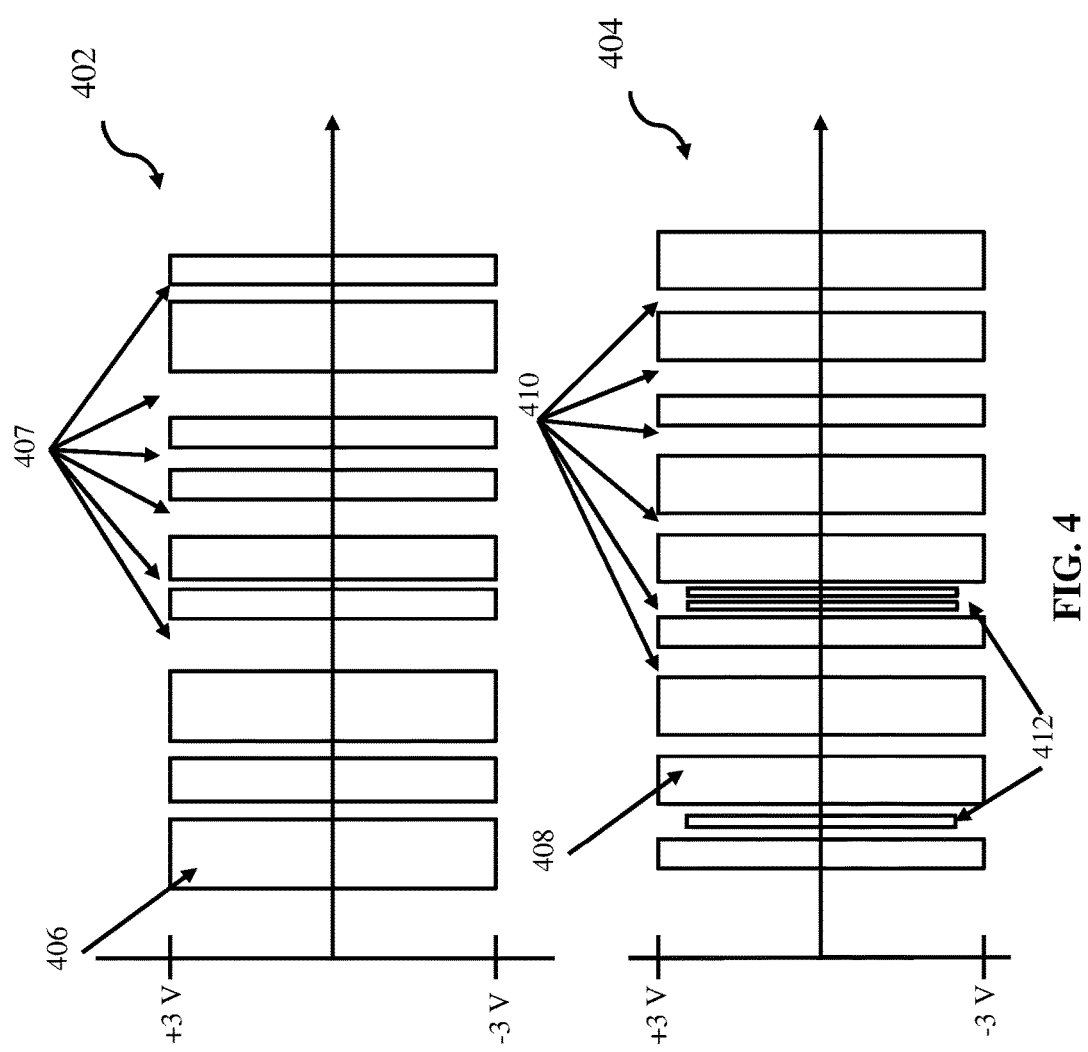
FIG. 4 depicts two graphs showing an unfiltered speed sensor signal having mechanically-induced signal noise and a filtered speed signal sensor having signal noise filtered according to one embodiment.

FIG. 4 depicts two graphs 402 and 404. Graph 402 depicts a signal graph of an unfiltered signal 406 having mechanically-induced signal noise. Graph 404 depicts a graph of a filtered signal without signal noise. Referring to graph 402, each signal block 406 represents a sinusoidal signal at +−3V. Each block represents a target group passing input speed sensor 102. The spaces depicted in graph 402 represent the space between target groups 202 (as depicted in FIG. 2) as rotating member 110 rotates about axis 111. In some aspects a processor may count rotations of rotating member 110 by counting the spaces between target groups 202. As shown in graph 402, the signal spacing 407 may be irregular or include extra pulses due to distorted signal readings caused by mechanical vibration.

As shown in graph 404, a graph of a filtered signal is shown. In some embodiments processor 118 receives a filtered signal with the mechanically-induced signal noise removed by system 100. Processor 118 may correct spaces 410 by adding one or more pulses 412. Thus the corresponding spaces 410 between signal blocks 408 may now follow a predictable pattern with respect to spacing. Accordingly, processor 118 may accurately count rotations and/or determine a rotational direction.

Figure 5:
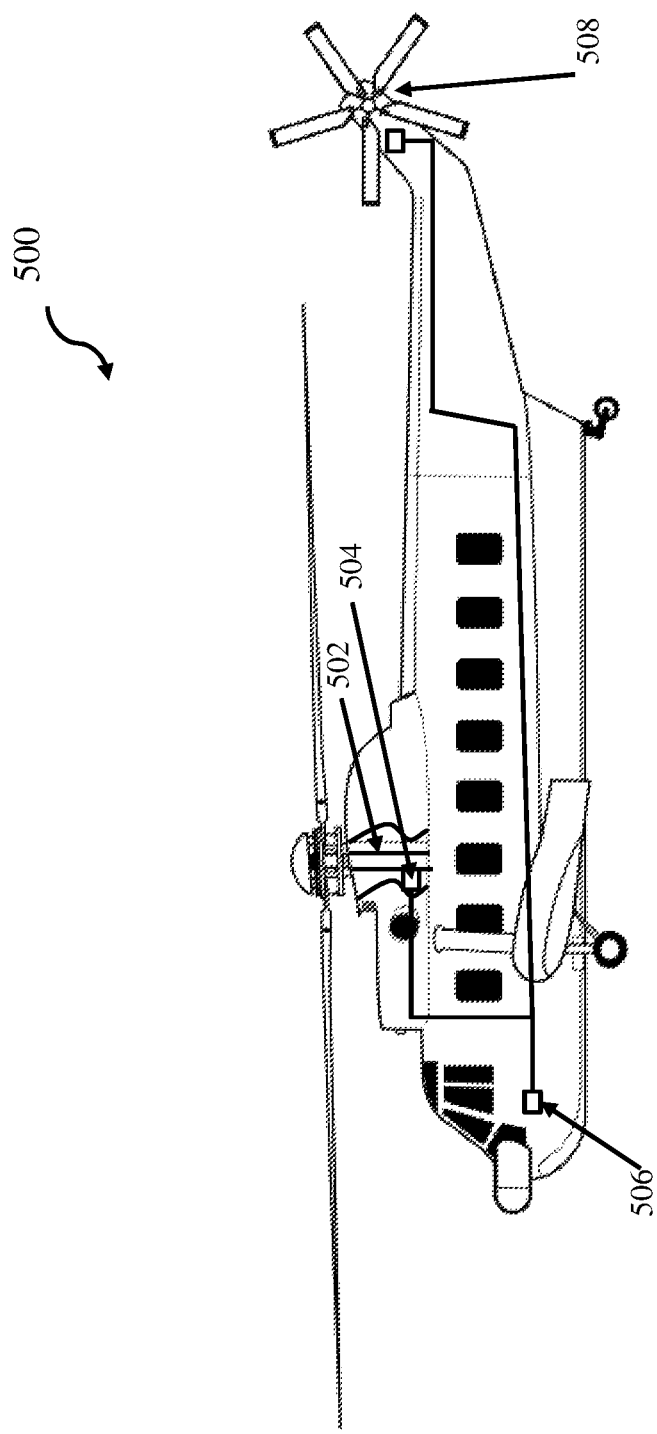
FIG. 5 depicts a helicopter configured with a system for filtering mechanically-induced signal noise from a speed sensor according to one embodiment.

FIG. 5 depicts a helicopter 500 configured with a system 504 for filtering mechanically-induced signal noise from a speed sensor, according to one embodiment. As shown in FIG. 5, helicopter 500 may include a rotor system 502, which may be configured as part of a system 504 for filtering mechanically-induced signal noise from a speed sensor. In some aspects, system 504 may be operatively connected to a flight computer 506 and provide a speed signal indicative of a rotating speed of rotor system 502. Although FIG. 5 depicts system 504 as part of a main rotor, system 504 may be part of any rotor system or other rotating member of rotor system 502 including, for example, a rear rotor system 508.

The flowchart and block diagrams in the Figures illustrate the architecture, functionality, and operation of possible implementations of systems, methods, and apparatus according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for filtering mechanically-induced signal noise from a speed sensor comprising:
   a rotating member having at least one target group radially oriented about a center of the rotating member;
   an inductive speed sensor configured to sense the at least one target group;
   two diode pairs each having a first diode and a second diode, wherein the two diode pairs are operatively connected to the inductive speed sensor to receive a signal having the mechanically-induced signal noise;
   a resistor connecting the diode pairs; and a processor connected in parallel with the resistor and configured to receive a signal from the inductive speed sensor via the diode pairs, the processor configured to:
   determine a rotational speed of the rotating member based on the signal received from the inductive speed sensor via the diode pairs.

2. The system of claim 1, wherein the first diode in each of the diode pairs are configured for an opposite current flow with respect to the second diode in each of the diode pairs.

3. The system of claim 1, wherein the system includes exactly two diode pairs.

4. The system of claim 1, wherein the rotating member is a helicopter propeller.

5. A method for filtering mechanically-induced signal noise from an inductive speed sensor comprising:
   sensing at least one target group attached to a rotating member with the inductive speed sensor having a first output and a second output;
   reducing noise in a signal sensed with the inductive speed sensor by coupling two diode pairs to outputs of the inductive speed sensor, a first diode pair being coupled to the first output and a second diode pair being coupled to second output and the first and second diode pairs having outputs coupled together by a resistor, each diode pair having a first diode and a second diode;
   providing the reduced noise signal to a processor; and
   determining a rotational speed of the rotating member based on the signal provided to the processor.

6. The method of claim 5, wherein the first diode in each of the diode pairs are configured for an opposite current flow with respect to the second diode in each of the diode pairs.

7. The method of claim 5, wherein connecting the two diode pairs to the inductive speed sensor comprises connecting exactly two diode pairs.

8. The computer-implemented method of claim 5, wherein the rotating member is a helicopter propeller.

9. A helicopter configured with a system for filtering mechanically-induced signal noise from a speed sensor comprising:
   a propeller having at least one target groups radially oriented about a center of a rotating member;
   an inductive speed sensor configured to sense the at least one target group;
   two diode pairs each having a first diode and a second diode, the two diode pairs operatively connected to the inductive speed sensor and configured to receive a signal having the mechanically-induced signal noise;
   a resistor connecting the diode pairs; and
   a processor connected in parallel with the resistor and configured to receive a signal from the inductive speed sensor via the diode pairs, the processor configured to:
      determine a rotational speed of the rotating member based on the signal received from the inductive speed sensor via the diode pairs.

10. The helicopter of claim 9, wherein the first diode in each of the diode pairs are configured for an opposite current flow with respect to the second diode in each of the diode pairs.

11. The helicopter of claim 9, wherein the system includes exactly two diode pairs.

12. The system of claim 9, wherein the rotating member is a helicopter propeller.

* * * * *